(12) United States Patent
Bonen (10) Patent No.: US 11,589,092 B2
(45) Date of Patent: Feb. 21, 2023

(54) RETAINING LEGACY STB SUPPORT WITH HFC PLANT MIGRATION TO HIGH SPLIT

(71) Applicant: Harmonic, Inc., San Jose, CA (US)

(72) Inventor: Adi Bonen, Belle Mead, NJ (US)

(73) Assignee: Harmonic, Inc., San Jose, CA (US)

( * ) Notice: Subject to any disclaimer, the term of this patent is extended or adjusted under 35 U.S.C. 154(b) by 324 days.

(21) Appl. No.: 16/657,909

(22) Filed: Oct. 18, 2019

(65) Prior Publication Data

US 2020/0329262 A1 Oct. 15, 2020

Related U.S. Application Data

(60) Provisional application No. 62/833,756, filed on Apr. 14, 2019.

(51) Int. Cl.
| | |
|---|---|
| *H04N 7/173* | (2011.01) |
| *H04N 21/2381* | (2011.01) |
| *H04N 21/437* | (2011.01) |
| *H04N 21/2662* | (2011.01) |
| *H04B 10/2575* | (2013.01) |

(52) U.S. Cl.
CPC ... *H04N 21/2381* (2013.01); *H04B 10/25751* (2013.01); *H04N 21/2662* (2013.01); *H04N 21/437* (2013.01)

(58) Field of Classification Search
CPC .......... H04N 21/2381; H04N 21/2662; H04N 21/437; H04N 21/25751; H04B 10/25751
See application file for complete search history.

(56) References Cited

U.S. PATENT DOCUMENTS

2013/0276047 A1* 10/2013 Chapman ......... H04N 21/42676
725/111
2018/0020256 A1* 1/2018 Ibelings ............. H04B 10/2507

* cited by examiner

*Primary Examiner* — Mulugeta Mengesha
(74) *Attorney, Agent, or Firm* — Brokaw Patent Law PC; Christopher J. Brokaw (57) ABSTRACT

Propagating a downstream (DS) Out-of-Band (OOB) signal at a frequency receivable by a set of legacy set-top boxes (STBs) while supporting enhanced upstream peak data rates. At an input of an amplifier of a physical device, a portion of the DS-OOB signal is tapped to create a tapped DS-OOB signal, which comprises both the DS-OOB signal and all other downstream signals and channels sent from a head-end to a set of customer premises equipment (CPE) via the physical device. The tapped DS-OOB signal is introduced to a band-pass filter that passes the DS-OOB signal and attenuates all other radio frequency (RF) signals to create a filtered DS-OOB signal. The filtered DS-OOB signal is amplified and coupled to a low-pass side of a high-split diplex filter to propagate onto a transmission medium coupled to the CPE. The physical device may be a high-split RF amplifier or a high-split node.

20 Claims, 11 Drawing Sheets

RETAINING LEGACY STB SUPPORT WITH HFC PLANT MIGRATION TO HIGH SPLIT

CLAIM OF PRIORITY

This application claims priority to U.S. Provisional Patent Application Ser. No. 62/833,756, filed Apr. 14, 2019, entitled "Retaining Legacy STB Support in Optical Nodes and RF Amplifiers with HFC Plant Migration to High Split," the contents of which are hereby incorporated by reference in their entirety for all purposes as if fully set forth herein.

FIELD OF THE INVENTION

Embodiments of the invention generally relate to propagating a downstream (DS) Out-of-Band (OOB) signal at a frequency receivable by a legacy STB, and other legacy DS signals at a frequency receivable by their intended legacy receiver, while supporting enhanced upstream peak data rates and data rate capacities.

BACKGROUND

Hybrid Fiber Coax (HFC) is a term that refers to a broadband network based on a combination of optical fiber and coaxial cable. A HFC architecture is often used by cable TV (CATV) operators. In modern cable TV networks, optical fiber is used to transport data between a headend and an optical node deployed in a neighborhood or area of service, while coaxial cable is used to transport data between the optical node and the local houses and locations in the area of service of that optical node.

Over the years, the CATV HFC architecture has evolved such that the optical node is deployed increasingly closer to the cable customers' premises. Older HFC systems deployed long chains of amplifiers (sometimes, but not always, arranged in a tree structure) between the optical node and cable customers' homes. Over time, amplifier chains have become shorter by converting a single long chain of amplifiers connected to a single optical node into multiple, smaller chains of amplifiers connected to multiple optical nodes, such that the same area of service previously supported by a single optical node is now serviced by a plurality of optical nodes.

The size of the service domains of an optical node are often quantified not by the length and reach of the coaxial cables, but rather by the number of cascaded amplifiers used in the path of the coaxial cable running between the optical node and the cable customer's premises. For example, an N+6 deployment signifies that there are as many as 6 amplifiers cascaded between the optical node (N) and at least one or more customers.

In a Radio Frequency (RF) amplifier chain, each RF amplifier typically receives a low-level downstream RF signal from the end of a coaxial cable segment connected to its downstream (DS) input port, amplifies the RF signal, and outputs the amplified RF signal onto the next coaxial cable segment. The RF amplifier also receives a low-level upstream RF signal from the end of a coaxial cable segment connected to its upstream input port (which is also the downstream output port), amplifies that RF signal, and outputs that amplified RF signal onto the next coaxial cable segment at the upstream output port (which is also the downstream input port). Thus, a RF amplifier handles counter propagating downstream and upstream signals.

The RF amplifier always has one downstream input port but may have two or more downstream output ports. Accordingly, the RF amplifier may need to internally split the downstream signal onto multiple output ports, and internally combine the upstream signals received from multiple upstream input ports.

Recently, a major evolutionary step has become popular, often termed fiber-deep deployment, where a fiber optic cable (or simply "fiber") is extended from a cable operator's headend or hub deep into the CATV outside plant, close to the customers' premises, into a node that produces RF signals for final distribution over the coaxial network. Fiber-deep deployment avoids the need to pass the RF signals through HFC plant RF amplifiers. Another term used for this architecture is N+0, where N stands for the node and zero signifies that there are no (zero) standalone RF amplifiers between the node and the customers' premises. Most such high output FD nodes comprise 4 RF output ports, each driven by a dedicated high output internal power amplifier.

In another dimension of CATV plant evolution, the HFC network available spectrum has been increased over the years. While early HFC plants have been limited to about 300 MHz of usable spectrum, most current HFC plants have been upgraded multiple times, and currently operate in the range of 5 MHz to 750 MHz. Some more advanced HFC plants have been upgraded further, and while keeping the same low 5 MHz limit, they can use an upper limit of 870 MHz, 1002 MHz, and perhaps even 1218 MHz.

The HFC plants are designed such that downstream and upstream transmissions utilize a different portion of the overall available spectrum. Upstream transmissions (i.e., in the direction from homes to the cable headend) use the lower part of the spectrum, and downstream transmissions (i.e., in the direction from the cable headend to homes) use the upper part of the spectrum. HFC plants are typically designed with a specific small guard band between the upstream and downstream signals. A typical guard band width is between 20% and 30% of the highest frequency usable by upstream signals.

Diplex filters are commonly used in optical nodes, HFC plant RF amplifiers, home amplifiers, and consumer premises equipment (such as cable modems, set top boxes, and the like) to facilitate combining downstream and upstream signals onto a single coaxial cable. Diplex filters are typically composed of a low-pass filter to pass the upstream signals but block the downstream signals, and a high-pass filter to pass the downstream signals but block the upstream signals.

Both low-pass and high-pass filters possess a pass band, a stop band, and a transition band between them. Diplex filters are typically designed to apply a very low loss in their pass band, and a certain minimal required deliberate loss in their stop band. The complexity and cost of a diplex filter is inversely associated with the filter's guard band ratio "aggressiveness," namely, the ratio between the guard band frequency width and the highest frequency usable by upstream signals. For example, a 42/54 MHz diplex filter (typically called a low-split diplex filter) has a 28.6% guard band ratio, which is considered non-aggressive. On the other hand, an 85/102 MHz diplex filter has a 20% guard band ratio, which is considered aggressive.

Figure 1A:
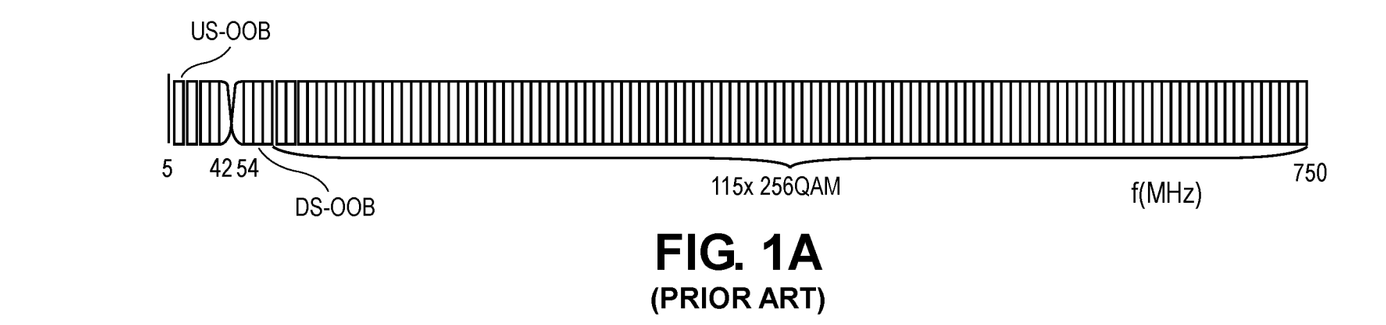
FIG. 1A is an illustration of a typical North American 750 MHz low-split HFC plant spectrum employed by a 42/54 MHz diplex filters, a DS-OOB signal centered at 75.25 MHz, a US-OOB signal centered at 15 MHz, four DOCSIS 3.0 upstream channels, and 115 downstream 256 QAM channels in accordance with the prior art.
Figure 1B:
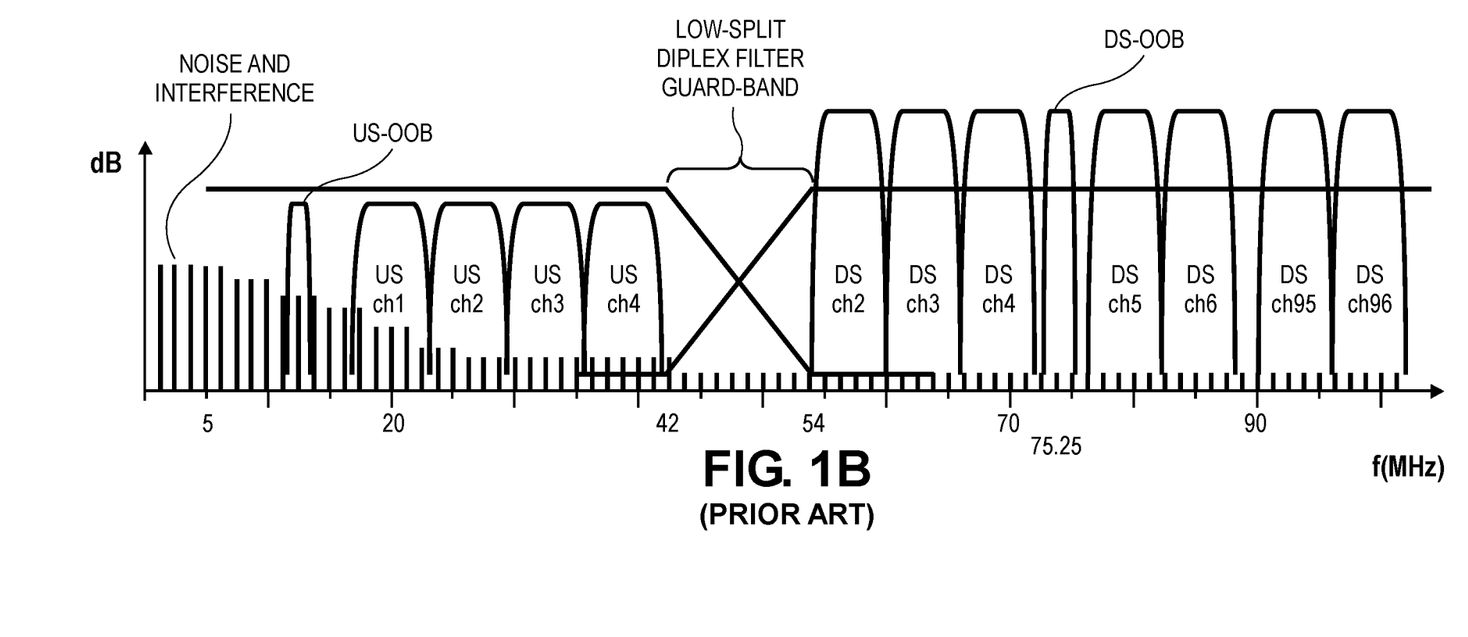
FIG. 1B is an illustration of an enhanced view off the lower frequency region of the spectrum depicted by FIG. 1A in accordance with the prior art.

Almost all the present North American HFC plant deployments use low-split 42/54 MHz diplex filters, meaning that the low portion of the spectrum up to 42 MHz is used for upstream transmissions, while the high portion of the spectrum starting from 54 MHz is used for downstream transmissions. FIG. 1A is an illustration of a typical North American 750 MHz low-split HFC plant spectrum allocation with a 42/54 MHz diplex filter, the downstream Out-of-Band (DS-OOB) signal centered at 75.25 MHz, the upstream Out-of-Band (US-OOB) signal, four DOCSIS 3.0 upstream channels, and 115 downstream 256 QAM channels in accordance with the prior art. To provide a better appreciation of the lower frequency region of the spectrum, FIG. 1B is an illustration of an enhanced view of the lower frequency region of the spectrum depicted by FIG. 1A in accordance with the prior art.

The lower part of the upstream spectrum is prone to greater interference and noise. This is so because the lower the frequency, the more interference is present. This phenomenon is shown in FIG. 1B. As a result, only about the top 25 MHz of the upstream spectrum is typically used for upstream cable modem data transmissions. This amount of usable upstream spectrum supports a typical total upstream data transmission capacity of about 100 Mbps, which is shared by all the cable modems for which their upstream signals are combined into a single CMTS (Cable Modem Termination System) receiver.

Typical European HFC plant deployments use a slightly higher frequency split of 65/85 MHz. The slightly higher upstream/downstream split of a typical European HFC plant deployment allows for an upstream data transmissions capacity that is about double that of the typical North American deployment.

In recent years, due to the need to enable higher data throughputs in upstream transmissions from customers' cable modems, some North American HFC plant deployments have been upgraded to employ 85/102 MHz diplex filters (typically called mid-split diplex filters). This increase in the amount of usable upstream spectrum, which is less prone to interference and noise, typically enables up to a five-fold increase in upstream data capacity. Cable modems and CMTS, which were designed to support the DOCSIS 3.1 specifications and installed in an HFC plant designed with 204/258 MHz diplex filters (typically called high-split diplex filters), may support even a higher upstream data capacity. The total upstream data capacity in such a high-split HFC plant deployment can typically approach 1.7 Gbps.

Recall that the upstream data capacities discussed above are shared domain capacities, as the total upstream transmissions from all cable modems received by a single CMTS receiver cannot surpass the upper limit of the amount of upstream data supported by the CMTS. The group of cable modems which are served by or communicate with a single CMTS receiver are collectively called an upstream service group. Similarly, the group of cable modems that receive the downstream transmission of a certain CMTS transmitter are collectively known as a downstream service group. In a typical cable deployment, a downstream service group is composed of one or more (typically not more than 4) upstream service groups.

The peak upstream or downstream data transmission of any one cable modem is typically limited by the cable operator to a portion of the total transmission capacity enabled by the HFC plant in either the upstream or the downstream direction. Placing such limits on each cable modem is done to assure that a single customer will not use more than their allocated share of the complete available capacity of the service group. Cable operators typically advertise and offer to their customers several different tiers of service that support different downstream and/or upstream peak data rates. The highest data rate in either direction must account for the total data capacity in each direction respectively, the number of customers sharing the service group, and the usage statistics of those customers. To illustrate by example, in small service groups (e.g., 30 to 60 subscribers), a peak rate of up to ⅔ of the capacity may be enabled. In medium size service groups (e.g., up to 300 subscribers), a peak rate of up to ½ of the capacity may be enabled. In large size service groups (e.g., 500 subscribers and more), a peak rate of up to ⅓ or lower of the capacity may be enabled. However, in new deployments with much larger upstream data rate capacity (such as in a high-split plant), a new pattern has emerged, where the peak upstream rate enabled to a single modem can be a higher portion (up to 90% to 95%) of the service group capacity even in large service groups.

An HFC plant evolution in the form of node segmentation has had a large effect on the total capacity of the HFC plant, but the effect on the peak data rate is smaller. For example, a 10-way segmentation converting a mid-size service group of 300 subscribers to 10 small service groups of 30 subscribers each will increase the total data capacity by a factor of 10. However, the peak rate achievable by a single subscriber is typically increased by only 33%.

For quite a few years, cable operators have been using node segmentation to increase both data capacity and data peak rate. In the downstream direction, node segmentation was employed to increase the total downstream spectrum available to DOCSIS data transmission, either by increasing the total available downstream spectrum or by reallocating a larger portion of the available downstream spectrum to data transmissions at the expense of less spectrum allocated to dedicated video transmissions. Consequently, over the years, growth of both downstream data capacity and downstream data peak rates has been consistently achieved.

However, while total upstream data capacity has grown substantially over the years due to node splits, the achievable upstream peak data rate has not grown by much, and a severe limit has been reached. A typical high tier service offering may include a 1 Gbps downstream rate, but only a 30 Mbps maximum upstream rate. This issue has recently caused some cable operators to initiate an HFC plant split upgrade. This type of upgrade is much costlier than node segmentation since it must be applied to the complete HFC plant all at once and cannot be implemented in a piecemeal fashion to just a particular set of service groups which require more data capacity.

Over the last 20 years, several hundred million of digital set top boxes (STBs) were installed in the homes of cable customers. Cable operators have introduced various interactive services with the help of these STBs. A key component that enabled these interactive services is the two-way communication supported by these STBs. While the two-way communication employed by most modern STBs is DOCSIS standard based, older STBs were based on proprietary and non-standard based systems. An estimated one hundred million such legacy proprietary based STBs are still used by cable customers in North America alone. Given the sheer number of legacy STBs in use, cable operators have need to maintain the legacy proprietary systems in order to enable two-way communication with those legacy STBs in use.

Those legacy proprietary two-way communication systems typically utilize Out-Of-Band (OOB) narrowband QPSK transmissions in both the downstream and the upstream direction. OOB refers to the use of dedicated external control, management, and monitoring channels that are outside the video channels transmitted to those legacy STBs. The downstream OOB transmitted signal is called the DS-OOB signal, and the upstream OOB transmitted signal is called the US-OOB signal.

The DS-OOB signal typically utilizes a frequency allocation in the lower part of the available downstream spectrum, and the US-OOB signal typically utilizes a frequency allocation in the lower part of the available upstream spectrum. The range of options for setting the DS-OOB frequency are restricted. In some cases, the DS-OOB frequency must be set to either one of only two possible choices, as limited by the hardware implementation of the legacy STBs. Specifically, many deployed legacy STBs are restricted to the use of either 75.25 MHz or 104.2 MHz for the center frequency of the narrowband QPSK signal. Other legacy STBs possess the capability of frequency agility, but with a relatively narrow allowed range of DS-OOB QPSK center frequency, specifically between 70 MHz to 130 MHz.

The traditional frequency allocation for the DS-OOB signal in low-split cable plants is 75.25 MHz. To enable the downstream transmission of the DS-OOB signal, HFC cable plants which were upgraded to a mid-split spectrum allocation required an aggressive 85/102 MHz diplex filter instead of the originally conceived non-aggressive 85/108 MHz diplex filter that is aimed at avoiding the FM band. This need to use the aggressive 85/102 MHz diplex filter arises because the use of 102 MHz as the low limit of the downstream frequency band permits allocating the first downstream frequency slot of 102-108 MHz to the DS-OOB signal, which can be centered at the specific frequency of 104.2 MHz. The selection of this frequency enables reception of the DS-OOB signal by both types of the legacy STBs mentioned above.

Figure 2A:
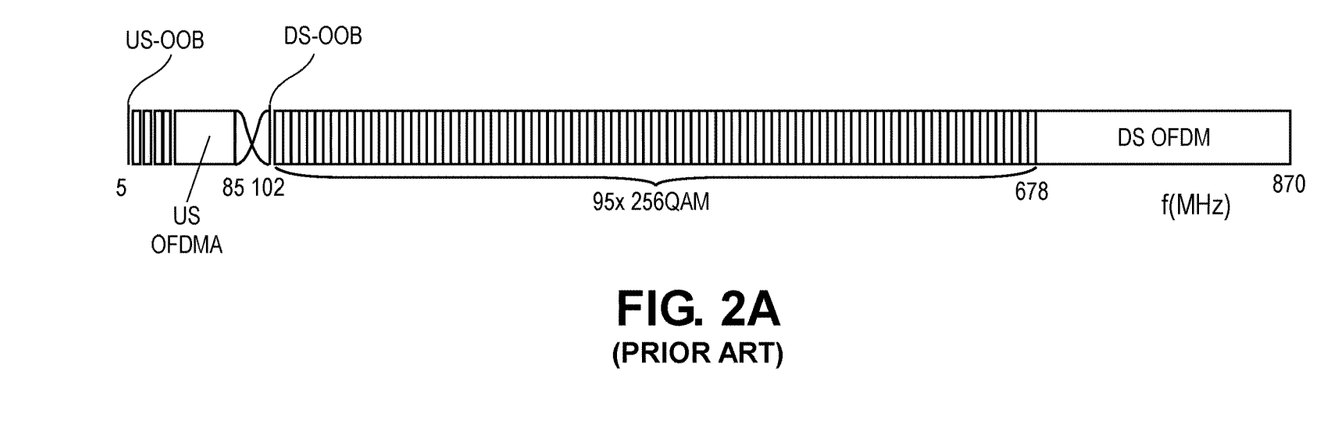
FIG. 2A is an illustration of a typical North American 870 MHz mid-split HFC plant spectrum employed by a 85/102 MHz diplex filters, a DS-OOB signal centered at 104.2 MHz, a US-OOB signal centered at 15 MHz, four DOCSIS 3.0 upstream channels, one partial DOCSIS 3.1 upstream OFDMA channel, 95 downstream 256 QAM channels, and one full DOCSIS 3.1 OFDM channel in accordance with the prior art.
Figure 2B:
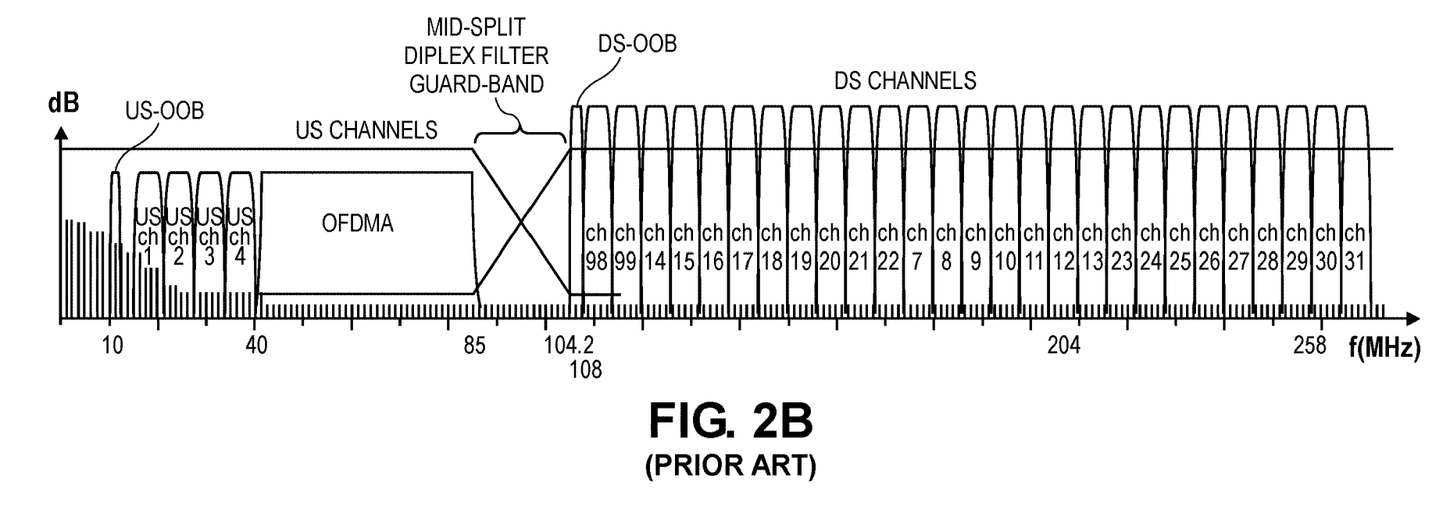
FIG. 2B is an illustration of an enhanced view off the lower frequency region of the spectrum depicted by FIG. 2A in accordance with the prior art.

To provide a graphical illustration, consider FIG. 2A, which is an illustration of a typical North American 870 MHz mid-split HFC plant spectrum with an 85/102 MHz diplex filters, the DS-OOB signal centered at 104.2 MHz, the US-OOB signal centered at 15 MHz, four DOCSIS 3.0 upstream channels, one partial DOCSIS 3.1 upstream OFDMA channel, 95 downstream 256 QAM channels, and one full DOCSIS 3.1 OFDM channel in accordance with the prior art. FIG. 2B is an illustration of an enhanced view off the lower frequency region of the spectrum depicted by FIG. 2A in accordance with the prior art.

The highest supported DS-OOB frequency in practically all legacy STBs does not permit the upgrade of an HFC plant to a high-split plant based on a 204/258 diplex filter. This is so because the lowest available downstream frequency in a high-split HFC plant is much higher than the highest DS-OOB frequency supported by legacy STBs. To be able to utilize the full upstream data transmission capabilities of DOCSIS 3.1 cable modems, cable operators are faced with a hard choice of retiring many millions of legacy STBs and replacing them with costly modern STBs that can utilize the DOCSIS standard for two-way communication. Thus, short of investing a large amount of money for replacing STBs to those STBs supporting modern standards, the highest supported DS-OOB frequency of legacy STBs limit the highest possible upstream data peak rates that cable operators can provide to their customers.

Figure 3:
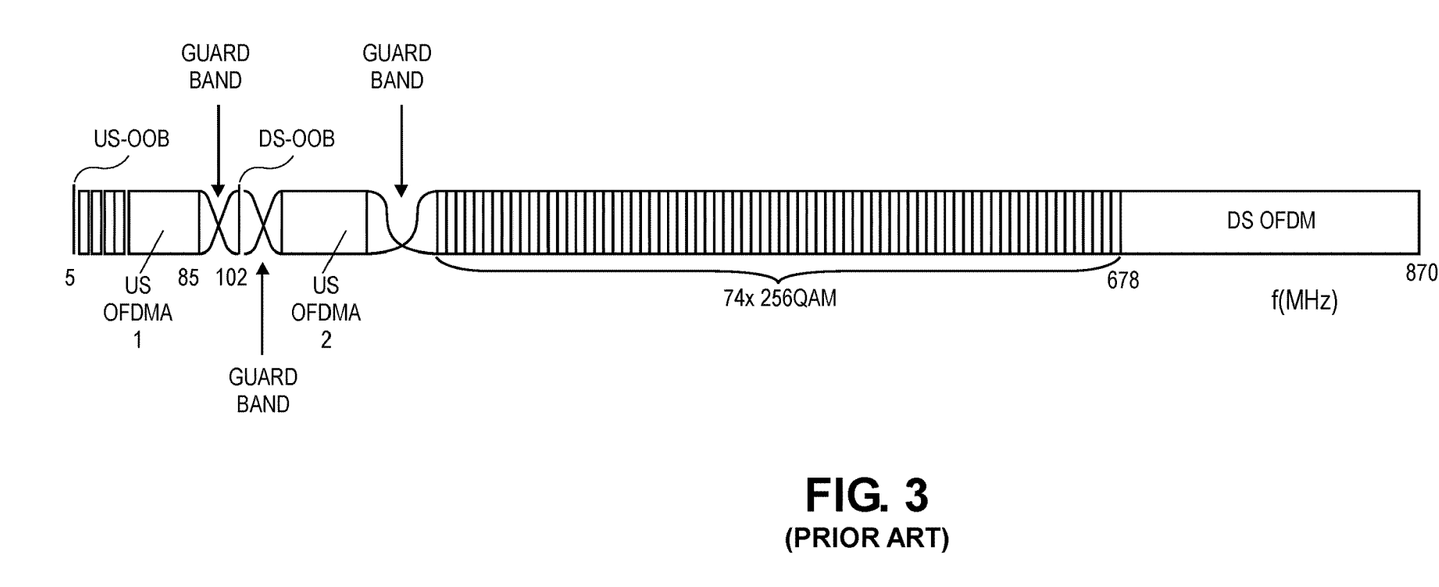
FIG. 3 is an illustration of an example of a North American 870 MHz HFC plant spectrum utilizing a quadplex filter to support a DS-OOB signal centered at 104.2 MHz in accordance with the prior art.

Several approaches have been considered to allow cable operators to support legacy STBs while increasing the available upstream spectrum. One such approach is the use of a quadplex filter, instead of a diplex filter, that implements two upstream bands interleaved with two downstream bands as depicted in FIG. 3. FIG. 3 is an illustration of an example of a North American 870 MHz HFC plant spectrum utilizing a quadplex filter to support a DS-OOB signal at 104.2 MHz in accordance with the prior art.

The use of the approach shown by FIG. 3 has at least two major drawbacks. First, the quadplex filter of FIG. 3 requires 3 guard bands instead of the single guard band of a diplex filter. The extra guard bands that are required waste a large portion of the spectrum, rendering a significant portion of the spectrum between 5 MHz to 204 MHz unusable for either downstream or upstream transmissions. Second, the number of electrical components required for the construction of a quadplex filter is about 3 times higher than the number of electrical components required for the construction of a diplex filter. This results in a similar threefold increase in both physical size and cost for every quadplex filter required.

U.S. Pat. No. 9,247,310, discusses a prior art approach for up-converting the DS-OOB signal to a frequency that is above the maximum upstream frequency supported by the headend. Thereafter, the DS-OOB signal is down-converted to a frequency receivable by the STB and injected into the coax cable at the output of any and all optical nodes and RF amplifiers in the HFC plant. The use of this approach has a major drawback by its complexity and the additional cost of adding a down-converting circuit to each of the involved devices at their locations.

Another prior art approach a cable operator might employ to support legacy STBs while increasing the available upstream spectrum is Full Duplex (FDX) DOCSIS in the DOCSIS 4.0 suite of specifications. FDX DOCSIS utilizes an RF splitter or RF coupler instead of a diplex filter, which enables a frequency overlapping transmission of downstream and upstream signals to be combined into a single coaxial cable. CableLabs of Louisville, Colo. has issued new specifications for FDX DOCSIS systems, and cable modems and CMTS supporting FDX DOCSIS are currently under development. It has been suggested that legacy STBs indeed could be maintained once HFC plants are upgraded to support FDX DOCSIS.

However, FDX DOCSIS also has several drawbacks. For example, FDX DOCSIS requires the development of new cable modems as well as new Remote-PHY nodes and Remote-PHY devices, and these new devices are estimated to be considerably more expensive than devices which do not support FDX DOCSIS. Also, the use of FDX DOCSIS is limited to N+0 fiber deep HFC plants, and the multiuse of any portion of the spectrum for both downstream and upstream cannot be extended across traditional HFC plant RF amplifiers. Thus, the deployment of FDX DOCSIS requires a costly plant upgrade to N+0. Additionally, the use of FDX DOCSIS is envisioned to require a very tightly maintained HFC plant, which involves removing and fixing various small imperfections that do not present significant problems when FDX DOCSIS is not utilized. Thus, HFC plant maintenance to enable FDX DOCSIS is considered a very costly endeavor.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches are described herein for propagating a downstream (DS) Out-of-Band (OOB) signal at a frequency receivable by a legacy STB, and other legacy DS signals at a frequency receivable by their intended legacy receiver, while supporting enhanced upstream peak data rates and data rate capacities according to an embodiment of the invention. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Overview

Most of the North American HFC cable plants are limited to a low-split 5-42 MHz upstream spectrum, which typically caps a DOCSIS 3.0 enabled upstream service to a peak rate that is under 50 Mbps. This peak rate for upstream service is hardly enough for a cable operator considering competitive pressure from Passive Optical Networks (PON) and the looming threat of 5G. Cable plant segmentation does increase available upstream capacity; however, even segmenting to fiber deep N+0 hardly affects supportable upstream peak rates unless upstream spectrum is also upgraded.

To date, most of the North American upstream spectrum upgrades have involved a mid-split that supports a 5-85 MHz upstream spectrum. When accompanied by an aggressive D3.1 cable modem deployment, such an upgrade enables upstream service peak rates in the 200–300 Mbps range. However, even this upstream service peak rate falls short of the goal of providing a PON-competitive 1 Gbps upstream service. Considering the factors that D3.1 cable modems supporting high-split (5-204 MHz upstream spectrum) have been available for quite some time, the cost of upgrading a HFC plant to support a mid-split spectrum is practically the same as upgrading to support a high-split spectrum, and employing a high-split spectrum can indeed enable an upstream gigabit service, it would be desirable for a HFC plant upgrade to support to a high-split spectrum rather than merely a mid-split spectrum. However, to avoid the additional cost associated with the replacement of the installed base of legacy STBs, the OOB downstream signal cannot be above 104.2 MHz, and thus no more than a mid-split HFC plant upgrade can be economically pursued.

Embodiments of the invention address and overcome this problem by enabling downstream propagation of the DS-OOB signal in a physical device, such as but not limited to an optical node, Remote-PHY node, and an RF amplifier. The physical device implementing an embodiment may be, but need not be, a high-split device, i.e., a device that support a split spectrum traditionally deemed high-split. For example, a HFC plant with the top upstream spectrum of higher or lower than 204 MHz may also use devices implementing an embodiment of the invention.

A device in accordance with an embodiment receives a DS-OOB signal. The device of an embodiment may comprise circuitry and/or be otherwise configured to process the received DS-OOB signal as follows. A portion of the input signal is sampled and a narrowband window around the received DS-OOB signal is separated by dedicated filters, amplified, and combined together with the normal signal(s) into the device output. Embodiments of the invention allow a device with high-split diplex filters to maintain the DS-OOB signal at a frequency receivable by a legacy STB. When an optical node or a Remote-PHY node implementing an embodiment of the invention is used in a fiber deep N+0 HFC plant, the DS-OOB signal can propagate all the way to customers' homes, thereby enabling the use of a legacy STB. At the same time, the use of a high-split diplex filter in the node enables the cable operator to provide a gigabit speed upstream service to customers.

Embodiments may also be employed in other contexts, such as to enable the downstream propagation of the DS-OOB signal in a high-split HFC plant RF amplifier. In such an embodiment, the DS-OOB is tapped from the single downstream input port (which is also the upstream output port) of the RF amplifier, after passing through the low-pass port of the high-split diplexer. Then, an amplified narrow-band window around the DS-OOB frequency of that signal is coupled into the upstream port of the diplex filter(s) serving the upstream input(s) and downstream output(s) of the RF amplifier. Example embodiments of the invention enable HFC plant RF amplifiers with a high-split diplex filter to maintain the DS-OOB signal at a frequency receivable by a legacy STB. Advantageously, embodiments of the invention allow cable operators to support and offer a gigabit speed upstream service to HFC plant customers to non-fiber-deep N+X HFC plants without the need to replace legacy STBs.

Spectrum Splits

In the prior art, the HFC spectrum was split to non-overlapping upstream and downstream frequency ranges, typically separated by a guard band frequency region. This approach of the prior art precluded the downstream conveyance of some specific legacy downstream (DS) signals, when said DS signals are rigidly restricted to one or more specific frequencies or a range of frequencies that are wholly enclosed in the upstream section of the split spectrum.

An example of how the HFC spectrum was split in the prior art is the DOCSIS 3.1 defined high-split, which defines the upstream frequency range at 5-204 MHz and defines the downstream frequency range at 258-1218 MHz. The DOCSIS 3.1 defined high-split spectrum precludes the ability to downstream transmit the SCTE 55-1 defined legacy out-of-band forward signal that is required to be conveyed at the specific frequencies of 75.25 MHz or 104.2 MHz, and the SCTE 55-2 defined legacy out-of-band forward signal that is required to be conveyed at the frequency range of 70 MHz to 130 MHz.

Embodiments Involving an Optical Node or a Remote-Phy Node

Embodiments of the invention enable the downstream propagation of the DS-OOB signal in a communication node. Advantageously, embodiments allow for a downstream (DS) Out-of-Band (OOB) signal to be propagated at a frequency receivable by a legacy STB while supporting enhanced upstream peak data rates, such as those experienced in a high-split spectrum. While specific examples of how a spectrum may be split will be discussed below and herein for purposes of providing a concrete example, it should be understood to those in the art that the embodiments of the invention discussed herein are not limited to any particular split or division of the spectrum. Thus, embodiments of the invention may be used in the context of a low-split, mid-split, high-split, or any additional or further developed usage of the spectrum that may be developed.

Figure 4A:
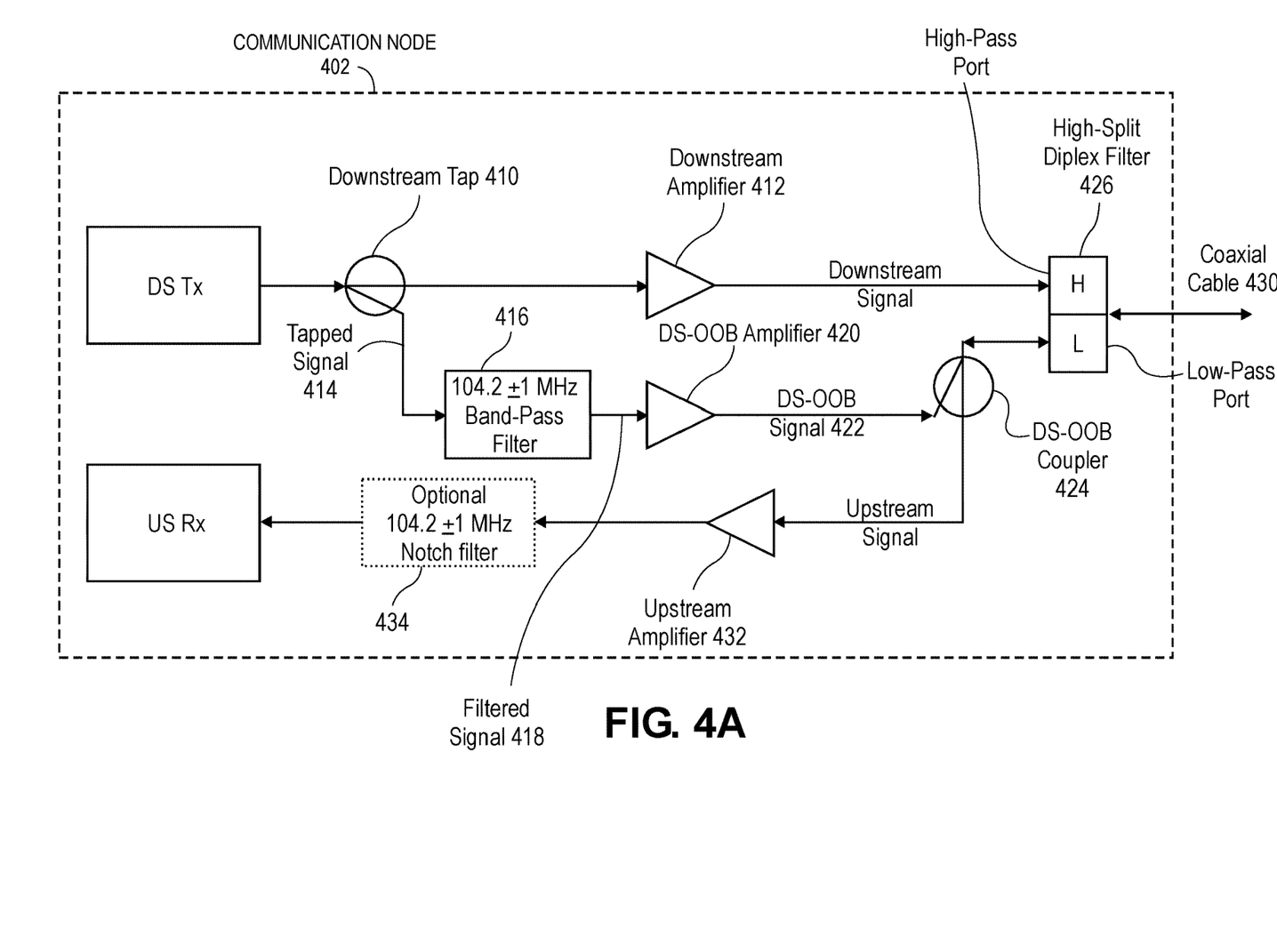
FIG. 4A is an illustration of a communication device supporting a high-split HFC plant as well as a DS-OOB signal centered at 104.2 MHz according to an embodiment of the invention.

FIG. 4A is an illustration of a communication node 402 supporting a high-split HFC plant as well as a DS-OOB signal centered at 104.2 MHz in accordance with an embodiment of the invention. Communication node 402 may be a high-split optical node or a Remote-PHY node. The term "Remote-PHY node" is well-understood in the art and discussed in U.S. patent application Ser. No. 15/847,029, entitled 'Dynamically Adjusting DOCSIS Port Utilization,' filed on Dec. 17, 2017, the entire disclosure of which is hereby incorporated by reference for all purposes as if fully set forth herein. The term "optical node" is well-understood in the art and discussed in U.S. patent application Ser. No. 16/372,952, entitled 'Power Saving by Configurable Adjustment of Power Amplifier,' filed on Apr. 2, 2019, the entire disclosure of which is hereby incorporated by reference for all purposes as if fully set forth herein. Optical nodes and Remote-PHY nodes are also discussed in U.S. Provisional Patent Application No. 62/893,625, entitled 'Aeronautical Band Leakage Test in High Split HFC Plant,' filed on Aug. 29, 2019, the entire disclosure of which is hereby incorporated by reference for all purposes as if fully set forth herein.

In FIG. 4A, a portion of the downstream signal power is tapped by downstream tap 410 at the input to node 402 and before downstream amplifier 412 to create tapped signal 414. Tapped signal 414 contains the DS-OOB signal as well as all other downstream signals and channels. Tapped signal 414 is introduced to band-pass filter 416, which is designed to pass only a narrowband frequency window around the DS-OOB signal. Thus, band-pass filter 416 passes the DS-OOB signal as filtered signal 418 but attenuates all other RF signals carried by tapped signal 414, including all other downstream signals and channels. Filtered signal 418 is further amplified as needed by DS-OOB amplifier 420 to result in amplified DS-OOB signal 422.

Amplified DS-OOB signal 422 is coupled via DS-OOB coupler 424 into the low-pass port of high-split diplex filter 426. In the prior art, the low-pass port of a high-split diplex filter is normally used only for upstream signals, which traverse over the low-pass port of a high-split diplex filter from coaxial cable 430 to node 402. However, in an embodiment, amplified DS-OOB signal 422 propagates through high-split diplex filter 426 in the same path taken by the upstream signal but in the opposite direction, i.e., amplified DS-OOB signal 422 propagates onto coaxial cable 430 via the low-pass port of high-split diplex filter 426.

The DS-OOB signal is also being processed and amplified by downstream amplifier 412 by downstream RF processing chain of node 402, but that DS-OOB signal is introduced to the high-pass port of high-split diplex filter 426. This DS-OOB signal is blocked from passing through the high-pass port of high-split diplex filter 426 because high-split diplex filter 426 blocks signals at a frequency below the maximum upstream frequency (typically 204 MHz in a high split diplex filter). However, DS-OOB signal 422, which is coupled to the low-pass port of high-split diplex filter 426, is in the pass-band of high-split diplex filter 426 and indeed is passed to the output of node 402 onto coaxial cable 430.

In an embodiment, while upstream amplifier 432 provides amplification in the upstream path, optional notch filter 434 (or band reject filter) as shown in FIG. 4A may be used to provide attenuation to a narrowband window around the frequency of the DS-OOB. This prevents leakage of the DS-OOB signal, or a signal echo introduced by imperfect RF components and devices internal and external to node 402, from interfering with the reception of the upstream signal by stressing the dynamic range of various components processing the upstream signal (such as the upstream analog to digital converter). In a typical utilization of node 402, a similar small frequency window around the DS-OOB signal is excluded from being used by upstream signals to prevent interference between the DS-OOB and upstream transmissions.

Figure 4B:
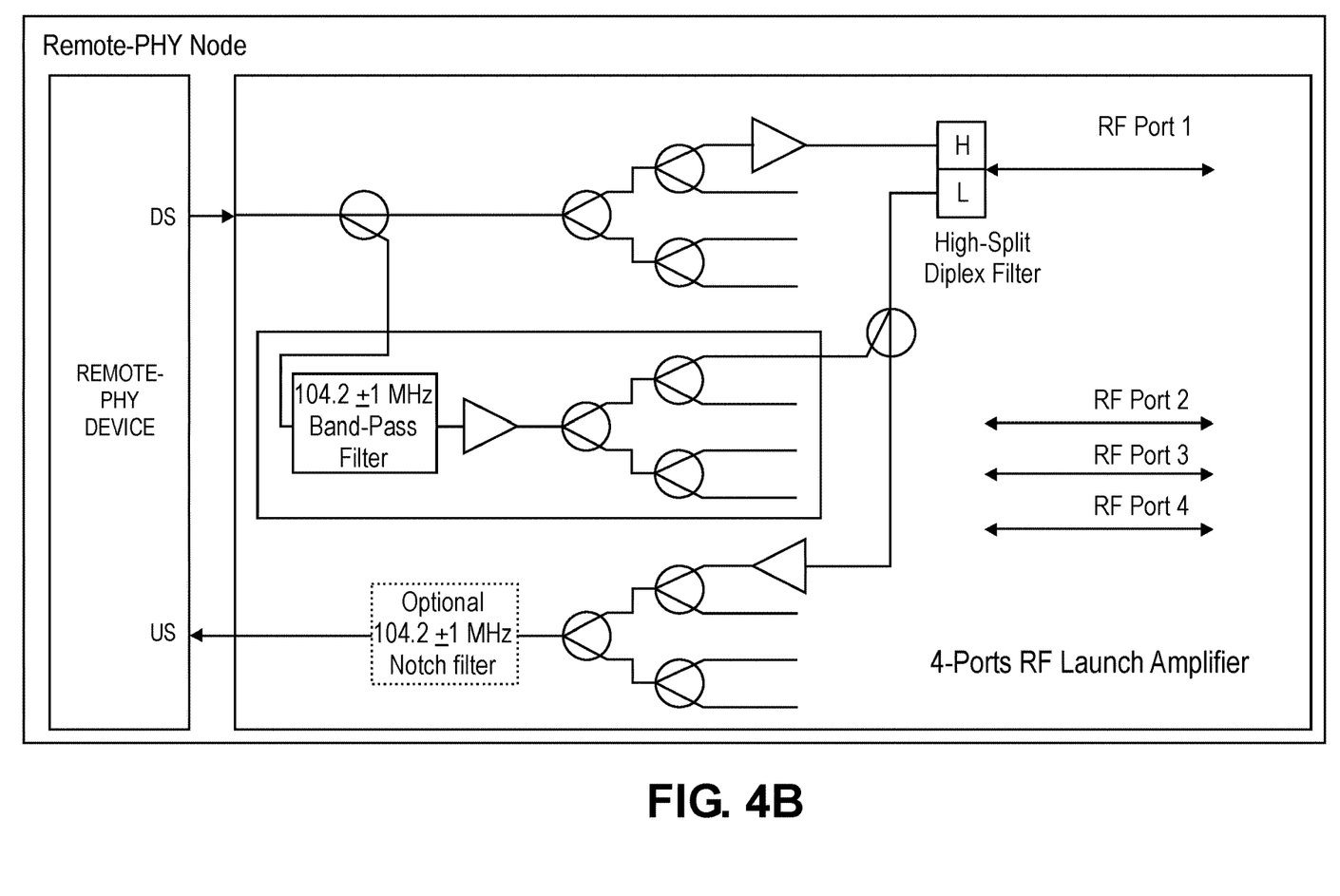
FIG. 4B is an illustration of a Remote-PHY node supporting a high-split HFC plant as well as a DS-OOB signal centered at 104.2 MHz across four RF ports (detail shown for Port 1) according to an embodiment of the invention.

Another embodiment of the invention, which extends the implementation to a node with a plurality of RF ports, is depicted by FIG. 4B. FIG. 4B is an illustration of a Remote- PHY node supporting a high-split HFC plant as well as DS-OOB at 104.2 MHz across four RF ports (detail provided at Port 1) according to an embodiment of the invention.

The DS-OOB signal is split to multiple instances, and each is separately coupled to the low-pass ports of the high-split diplex filters handling each one of the node ports.

Figure 4C:
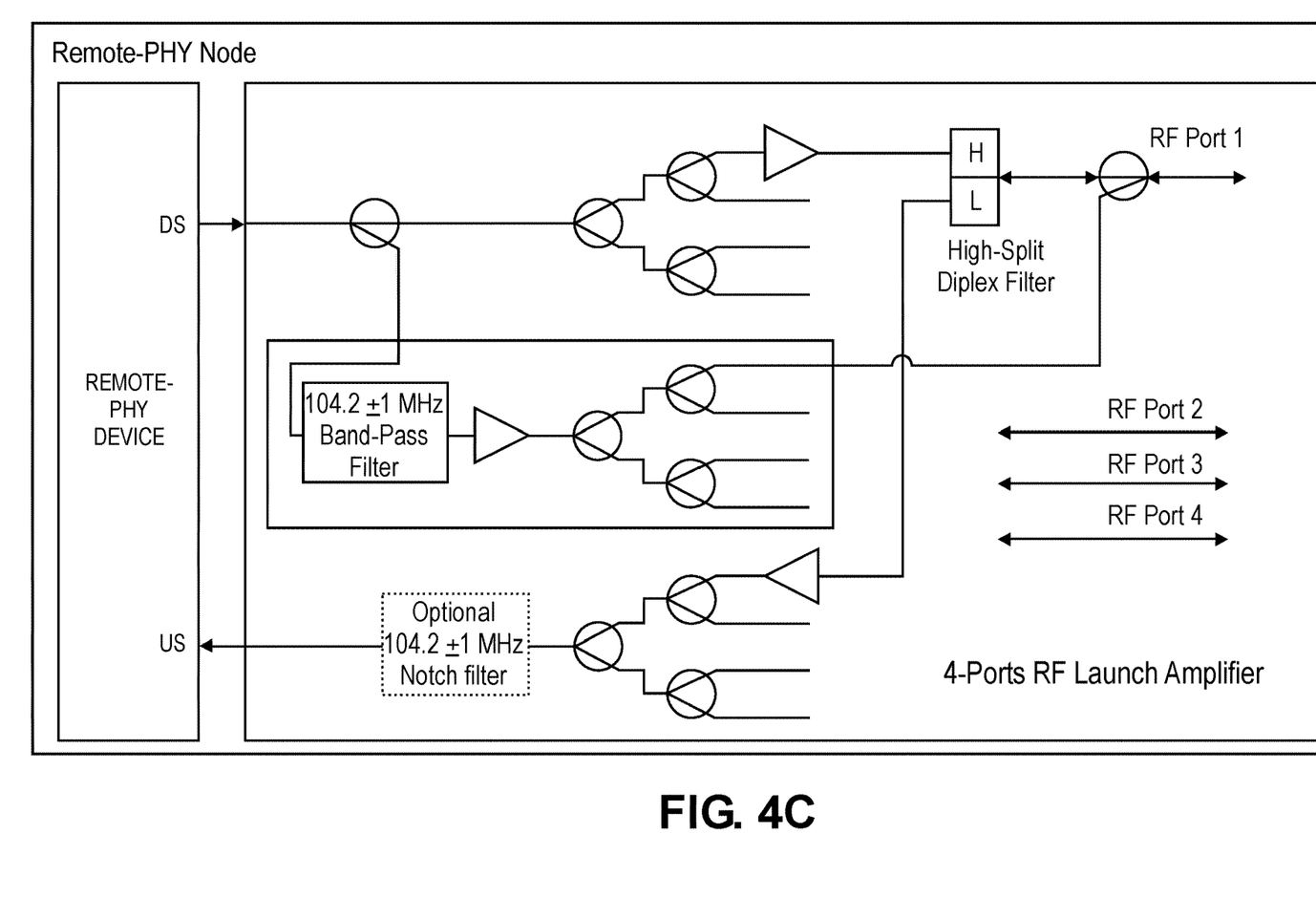
FIG. 4C is an illustration of a Remote-PHY node supporting a high-split HFC plant as well as DS-OOB signal centered at 104.2 MHz across four RF ports and with an output coupler after the diplexer (detail provided for Port 1) according to an embodiment of the invention.

FIG. 4C is an illustration of a Remote-PHY node supporting a high-split HFC plant as well as DS-OOB signal centered at 104.2 MHz across four RF ports and with an output coupler after the diplexer (detail provided for Port 1) according to an embodiment of the invention. In the embodiment depicted by FIG. 4C, an RF directional coupler is used to combine the DS-OOB signal to each one of the node ports after the diplex filter. Note that this embodiment has the undesired effect of introducing an additional RF power loss in the DS signal path after the high-power amplifier.

Figure 5A:
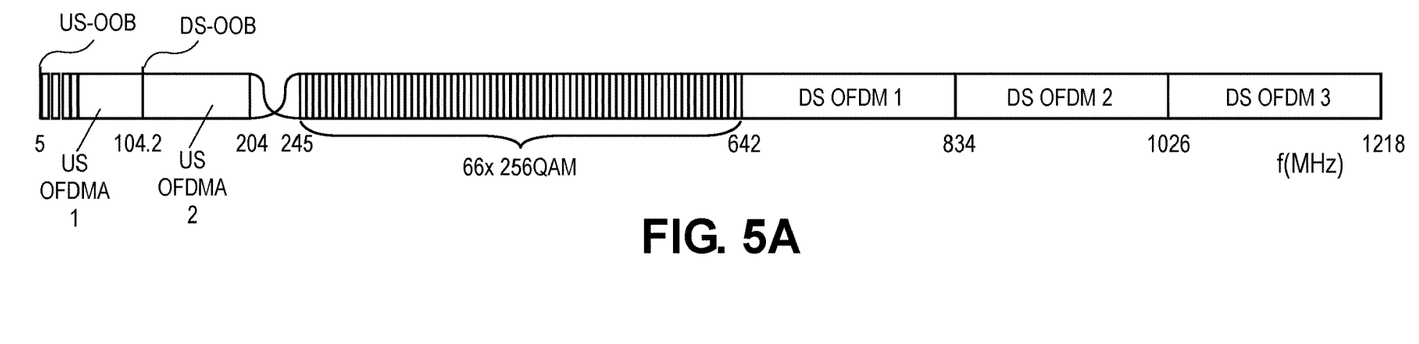
FIG. 5A is an illustration of a North American 1218 MHz high-split HFC plant spectrum utilizing an embodiment of the invention to support a DS-OOB signal centered at 104.2 MHz according to an embodiment of the invention.
Figure 5B:
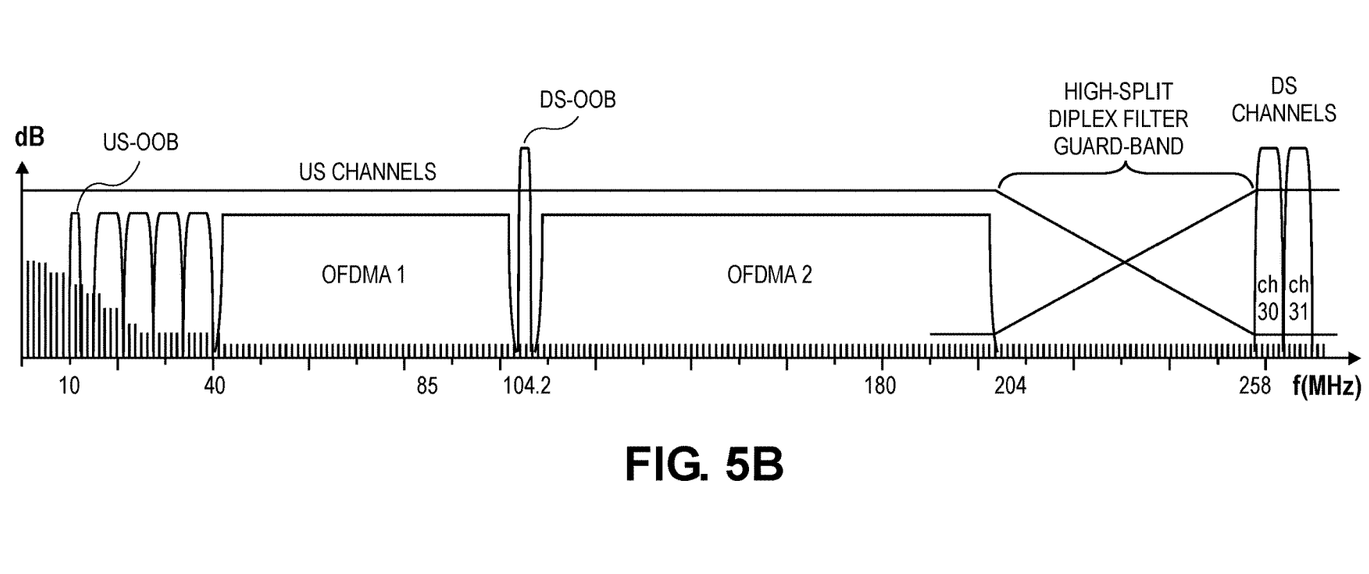
FIG. 5B is an illustration of an enhanced view of the lower frequency region of the spectrum shown in FIG. 5A according to an embodiment of the invention.

An example of an upstream channel arrangement used in conjunction with an embodiment of the invention when the DS-OOB signal is placed at 104.2 MHz is depicted by FIGS. 5A and 5B. FIG. 5A is an illustration of a North American 1218 MHz high-split HFC plant spectrum utilizing an embodiment of the invention to support DS-OOB at 104.2 MHz according to an embodiment of the invention. FIG. 5B is an illustration of an enhanced view of the lower frequency region of the spectrum shown in FIG. 5A according to an embodiment of the invention.

The US-OOB signal is typically placed at a frequency in the range of 10 to 15 MHz. Four DOCSIS 3.0 ATDMA upstream channels are typically placed in the frequency range between 15 to 42 MHz. One partial DOCSIS 3.1 OFDMA channel can be placed between 42 to 102 MHz. A second full DOCSIS 3.1 OFDMA channel can be placed between 108 to 204 MHz.

Figure 5C:
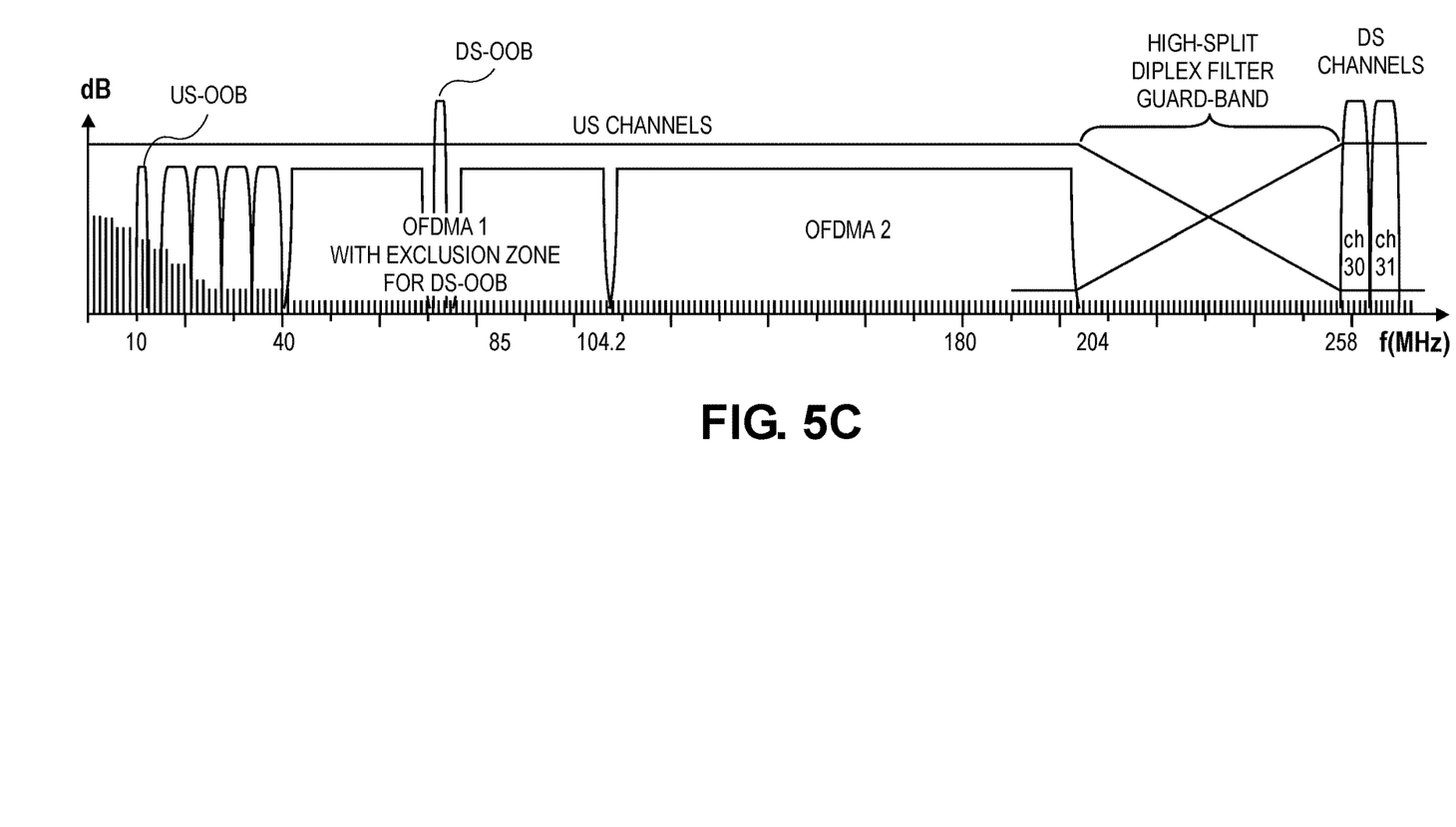
FIG. 5C is an illustration of an enhanced view off the lower frequency region of the spectrum shown by FIG. 5A that depicts an upstream channel arrangement in accordance with an embodiment of the invention.

FIG. 5C is an illustration of an enhanced view off the lower frequency region of the spectrum shown by FIG. 5A that depicts an upstream channel arrangement in accordance with an embodiment of the invention. The US-OOB signal is typically placed at a frequency in the range of 10 to 15 MHz. Four DOCSIS 3.0 ATDMA upstream channels are typically placed in the frequency range between 15 to 42 MHz. One partial DOCSIS 3.1 OFDMA channel can be placed between 42 to 108 MHz. That channel is configured with a 4 to 6 MHz exclusion zone around 75.25 MHz to avoid interference with the DS-OOB signal. A second full DOCSIS 3.1 OFDMA channel can be placed between 108 to 204 MHz.

Embodiments Involving an HFC Plant RF Amplifier

Figure 6A:
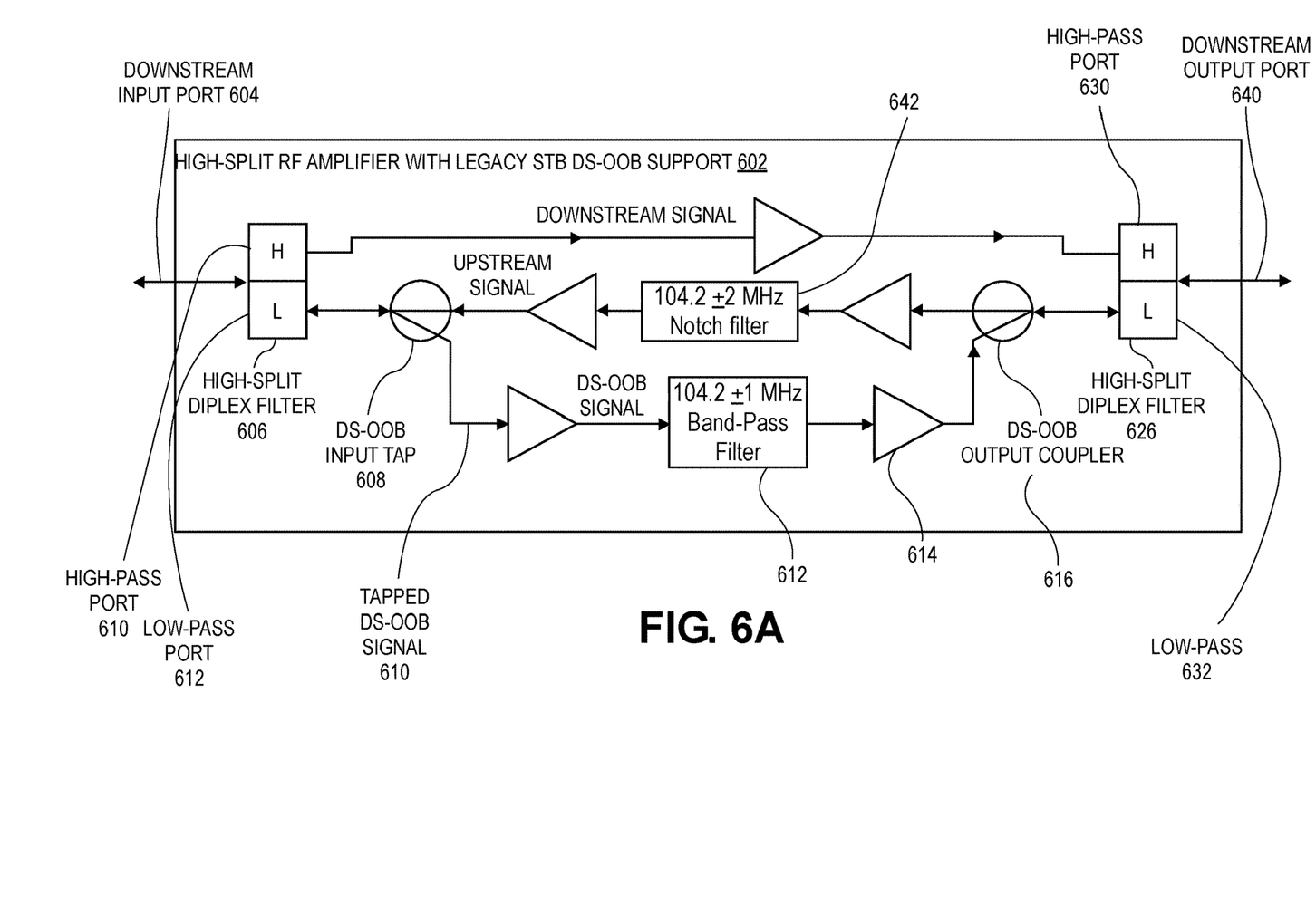
FIG. 6A is an illustration of an HFC plant RF amplifier supporting a high-split HFC plant spectrum as well as a DS-OOB signal centered at 104.2 MHz according to an embodiment of the invention.

An extension of the above embodiment of the invention further enables the downstream propagation of the DS-OOB signal in high-split HFC plant RF amplifiers, as depicted by the embodiment of the invention shown by FIG. 6A. FIG. 6A is an illustration of an HFC plant RF amplifier supporting high-split as well as a DS-OOB signal at 104.2 MHz in accordance with an embedment.

As shown in FIG. 6A, the DS-OOB signal enters the RF amplifier 602 at the single downstream input port 604, which also functions as the single upstream output port. The DS-OOB cannot follow the regular downstream signal to high-pass port 610 of high-split diplex filter 606. Instead, the DS-OOB signal is passed by high-split diplex filter 606 to low-pass port 612. After passing through low-pass port 612, the DS-OOB signal is tapped by DS-OOB input tap 608 to create tapped DS-OOB signal 610. Tapped DS-OOB signal 610 is introduced to band-pass filter 612, which is designed to pass only a narrowband frequency window around the DS-OOB signal. Thus, band-pass filter 612 passes the DS-OOB signal, but attenuates all other RF signals, including all other downstream and upstream signals and channels. The DS-OOB signal is amplified by amplifier 614 as needed and then coupled via DS-OOB output coupler 616 into low-pass port 632 of high-split diplex filter 626. High-split diplex filter 626 serves the downstream output (and upstream input) port 640 of RF amplifier 602. The DS-OOB signal propagates through high-split diplex filter 626 and high-split diplex filter 606 in the same path taken by the upstream signal but in the opposite direction.

As shown in FIG. 6A, notch filter 642 (or band reject filter) is added to the upstream signal processing chain to provide attenuation in a narrowband window around the frequency of the DS-OOB. Notch filter 642 typically has a slightly wider frequency window than band-pass filter 612 in the DS-OOB path. Notch filter 642 prevents undesired oscillations in RF amplifier 602 due to an RF amplifier trait known as loop-gain. Proper design of notch filter 642 will prevent oscillation from being created when RF leakage or echoes are introduced by imperfect RF components and devices internal and external to RF amplifier 602.

Figure 6B:
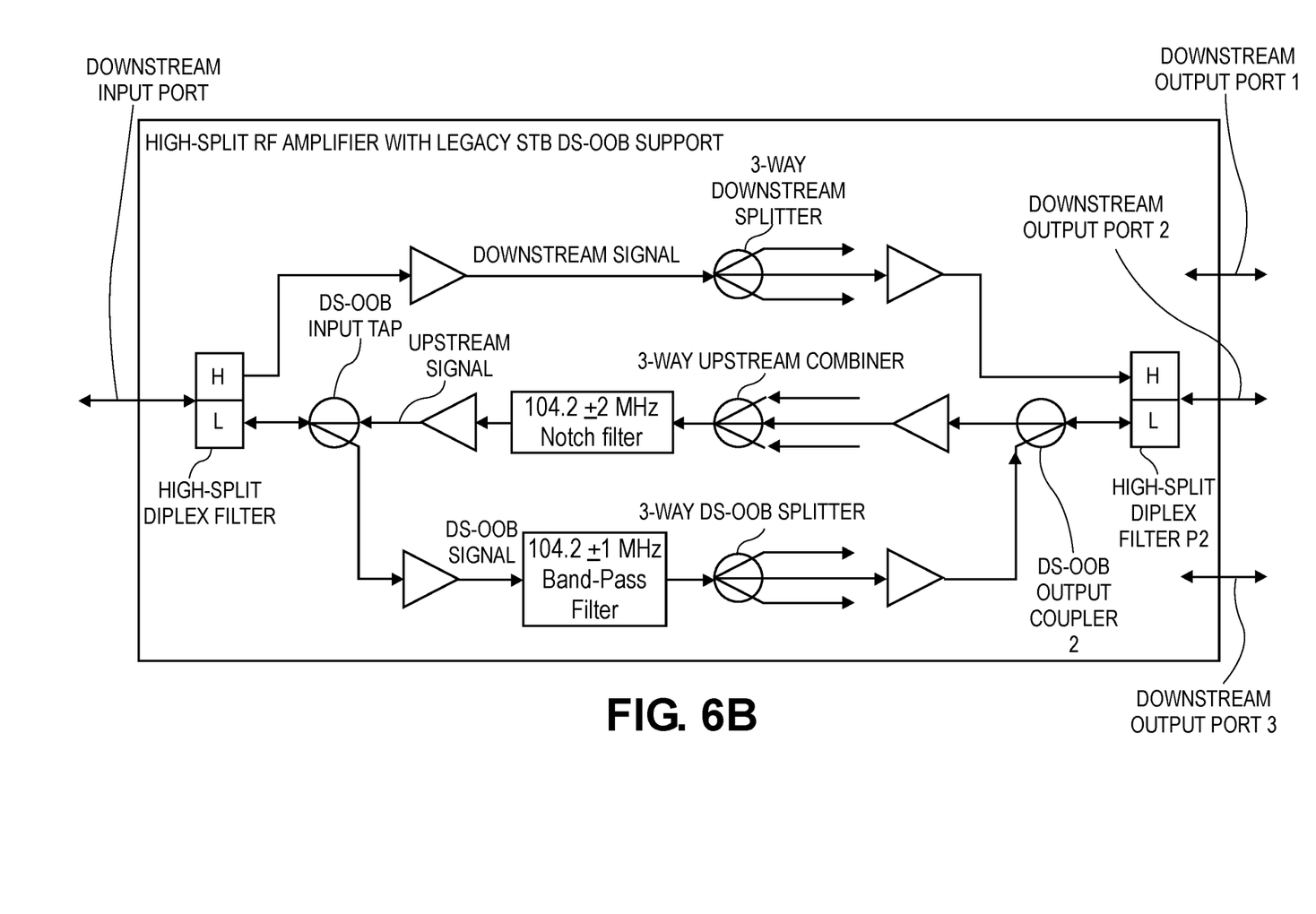
FIG. 6B is an illustration of an implementation of an HFC plant RF amplifier with a plurality of downstream output ports in accordance with an embodiment of the invention.

Another embodiment of the invention involving an HFC plant RF amplifier with a plurality of downstream output ports is depicted by the illustration of FIG. 6B. The HFC plant RF amplifier shown in FIG. 6B supports high-split as well as DS-OOB at 104.2 MHz across three downstream output ports (detail illustration provided only to Port 2). As shown by FIG. 6B, the DS-OOB signal is split to multiple instances, each of which is coupled to the low-pass ports of the high-split diplex filters handling each one of the RF amplifier's downstream output (also upstream input) ports.

Figure 6C:
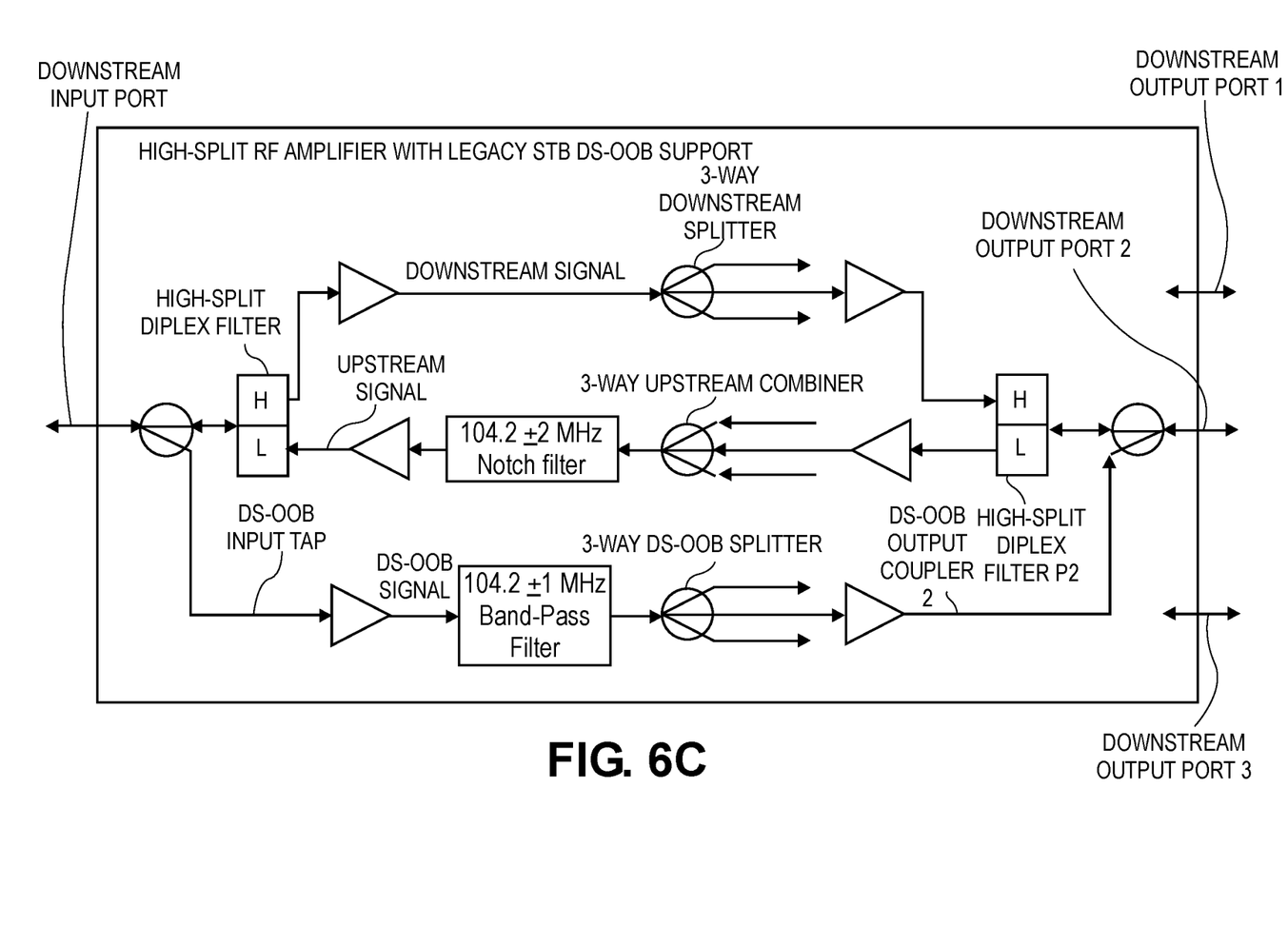
FIG. 6C is an illustration of a RF amplifier that supports a high-split HFC plant as well as DS-OOB signal centered at 104.2 MHz across three RF ports and with input and output couplers "outside" the diplexers (detail provided for Port 2) according to an embodiment of the invention.

FIG. 6C is an illustration of a RF amplifier that supports a high-split HFC plant as well as DS-OOB signal centered at 104.2 MHz across three RF ports and with input and output couplers "outside" the diplexers (detail provided for Port 2) according to an embodiment of the invention. In the embodiment depicted by FIG. 6C, an RF directional coupler is used to combine the DS-OOB signal to each one of the node ports "outside" the diplex filters (connected in line with the RF near the common port of each diplex filter), instead of "inside" the diplex filter (connected in line with the RF near the low port of each diplex filter). Note that this embodiment has the undesired effect of introducing an additional RF power loss in the DS signal path before the first DS amplifier and after the high-power amplifier. A hybrid embodiment of the invention may use one directional coupler "outside" the diplex filters (connected in line with the RF near the common port of an input or output diplex filter), and the other "inside" the diplex filter (connected in line with the RF near the low port of the opposing input or output diplex filter).

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A high-split node for propagating of a downstream Out-Of- Band (DS-OOB) signal, comprising:
   first circuitry for, at an input of an amplifier of the high-split node, tapping a portion of the DS-OOB signal to create a tapped DS-OOB signal, wherein the tapped DS-OOB signal comprises both (a) the DS-OOB signal and (b) all other downstream signals and channels sent from a head-end to a set of customer premises equipment (CPE) via the high-split node;
   second circuitry for introducing the tapped DS-OOB signal to a band-pass filter that passes the DS-OOB signal and attenuates other radio frequency (RF) signals, including said all other downstream signals and channels, to create a filtered DS-OOB signal;
   third circuitry for amplifying the filtered DS-OOB signal to create an amplified DS-OOB signal; and
   fourth circuitry for coupling the amplified DS-OOB signal to a low-pass side of a single diplex filter to propagate onto a transmission medium coupled to said set of customer premises equipment (CPE), wherein the amplified DS-OOB signal is propagated through the single diplex filter in an opposite direction as an upstream signal propagated through the single diplex filter, and wherein said upstream signal is sent from one of said set of customer premises equipment (CPE) to said head-end.

2. The high-split node of claim 1, wherein said high-split node processes a downstream signal that is limited to a frequency range placed in an upstream range of the single diplex filter.

3. The high-split node of claim 1, wherein said high-split node is a high-split optical node or a high-split Remote-PHY node.

4. The high-split node of claim 1, further comprising:
   a notch filter or a band reject filter for attenuating a portion of the DS-OOB signal that leaks into a signal path into an upstream receiver.

5. The high-split node of claim 1, further comprising:
   fifth circuitry for splitting the DS-OOB signal into multiple instances, wherein each separate instance of the DS-OOB signal is separately coupled to low-pass ports of high-split diplex filters handing each port of the high-split node.

6. A high-split RF amplifier for propagating of a downstream Out-Of-Band (DS-OOB) signal, comprising:
   first circuitry for, at a downstream input port of the high-split RF amplifier, coupling the DS-OOB a high-split diplex filter that passes the DS-OOB signal;
   second circuitry for tapping a portion of the DS-OOB signal passed by the high-split diplex filter to create a tapped DS-OOB signal, wherein the tapped DS-OOB signal comprises both (a) the DS-OOB signal and (b) all other downstream signals and channels sent from a head-end to a set of customer premises equipment (CPE) via the high-split RF amplifier;
   third circuitry for introducing the tapped DS-OOB signal to a single band-pass filter that passes the DS-OOB signal and attenuates all other radio frequency (RF) signals, including said all other downstream signals and channels, to create a filtered DS-OOB signal;
   fourth circuitry for amplifying the filtered DS-OOB signal to create an amplified DS-OOB signal; and
   fifth circuitry for coupling the amplified DS-OOB signal to a low-pass side of a single diplex filter to propagate onto a transmission medium coupled to set of customer premises equipment (CPE),
   wherein said downstream input port of the high-split RF amplifier is the upstream output port, and
   wherein said upstream input port of the high-split RF amplifier is the downstream output port.

7. The high-split RF amplifier of claim 6, wherein said high-split RF amplifier processes a downstream signal that is limited to a frequency range placed in an upstream range of the single diplex filter.

8. The high-split RF amplifier of claim 6, wherein said high-split node is a high-split optical node or a high-split Remote-PHY node.

9. The high-split RF amplifier of claim 6, further comprising:
   a notch filter or a band reject filter for attenuating a portion of the DS-OOB signal that leaks into a signal path designed to process and amplify the upstream signal.

10. The high-split RF amplifier of claim 6, further comprising:
    sixth circuitry for splitting the DS-OOB signal into multiple instances, wherein each separate instance of the DS-OOB signal is separately coupled to low-pass ports of high-split diplex filters handing each port of the high-split amplifier.

11. A method for propagating of a downstream Out-Of-Band (DS-OOB) signal, comprising:
    at an input of an amplifier of the high-split node, tapping a portion of the DS-OOB signal to create a tapped DS-OOB signal, wherein the tapped DS-OOB signal comprises both (a) the DS-OOB signal and (b) all other downstream signals and channels sent from a head-end to a set of customer premises equipment (CPE) via the high-split node;
    introducing the tapped DS-OOB signal to a band-pass filter that passes the DS-OOB signal and attenuates other radio frequency (RF) signals, including said all other downstream signals and channels, to create a filtered DS-OOB signal;
    amplifying the filtered DS-OOB signal to create an amplified DS-OOB signal; and
    coupling the amplified DS-OOB signal to a low-pass side of a single diplex filter to propagate onto a transmission medium coupled to said set of customer premises equipment (CPE), wherein the amplified DS-OOB signal is propagated through the single diplex filter in an opposite direction as an upstream signal propagated through the single diplex filter, and wherein said upstream signal is sent from one of said set of customer premises equipment (CPE) to said head-end.

12. The method of claim 11, wherein said high-split node processes a downstream signal that is limited to a frequency range placed in an upstream range of the single diplex filter.

13. The method of claim 11, wherein said high-split node is a high-split optical node or a high-split Remote-PHY node.

14. The method of claim 11, further comprising:
    attenuating a portion of the DS-OOB signal that leaks into a signal path into an upstream receiver using a notch filter or a band reject filter.

15. The method of claim 11, further comprising:
    splitting the DS-OOB signal into multiple instances, wherein each separate instance of the DS-OOB signal is separately coupled to low-pass ports of high-split diplex filters handing each port of the high-split node.

16. A method for a high-split RF amplifier propagating a downstream Out-Of-Band (DS-OOB) signal, comprising:
- at a downstream input port of the high-split RF amplifier, coupling the DS-OOB a high-split diplex filter that passes the DS-OOB signal;
- tapping a portion of the DS-OOB signal passed by the high-split diplex filter to create a tapped DS-OOB signal, wherein the tapped DS-OOB signal comprises both (a) the DS-OOB signal and (b) all other downstream signals and channels sent from a head-end to a set of customer premises equipment (CPE) via the high-split RF amplifier;
- introducing the tapped DS-OOB signal to a single bandpass filter that passes the DS-OOB signal and attenuates all other radio frequency (RF) signals, including said all other downstream signals and channels, to create a filtered DS-OOB signal;
- amplifying the filtered DS-OOB signal to create an amplified DS-OOB signal; and
- coupling the amplified DS-OOB signal to a low-pass side of a single diplex filter to propagate onto a transmission medium coupled to set of customer premises equipment (CPE),
- wherein said downstream input port of the high-split RF amplifier is the upstream output port, and
- wherein said upstream input port of the high-split RF amplifier is the downstream output port.

17. The method of claim 16, wherein said high-split RF amplifier processes a downstream signal that is limited to a frequency range placed in an upstream range of the single diplex filter.

18. The method of claim 16, wherein said high-split node is a high-split optical node or a high-split Remote-PHY node.

19. The method of claim 16, further comprising:
- a notch filter or a band reject filter attenuating a portion of the DS-OOB signal that leaks into a signal path designed to process and amplify the upstream signal.

20. The method of claim 16, further comprising:
- splitting the DS-OOB signal into multiple instances, wherein each separate instance of the DS-OOB signal is separately coupled to low-pass ports of high-split diplex filters handing each port of the high-split amplifier.

* * * * *